(12) United States Patent
Matsuo et al.

(10) Patent No.: US 11,919,158 B2
(45) Date of Patent: Mar. 5, 2024

(54) JOINT UNIT, ROBOT ARM AND ROBOT

(71) Applicant: TOKYO ROBOTICS INC., Tokyo (JP)

(72) Inventors: Yuki Matsuo, Tokyo (JP); Yoshihiro Sakamoto, Tokyo (JP)

(73) Assignee: TOKYO ROBOTICS INC., Tokyo (JP)

( * ) Notice: Subject to any disclaimer, the term of this patent is extended or adjusted under 35 U.S.C. 154(b) by 779 days.

(21) Appl. No.: 17/040,695

(22) PCT Filed: Mar. 28, 2019

(86) PCT No.: PCT/JP2019/013559
§ 371 (c)(1),
(2) Date: Sep. 23, 2020

(87) PCT Pub. No.: WO2019/198525
PCT Pub. Date: Oct. 17, 2019

(65) Prior Publication Data
US 2021/0053235 A1 Feb. 25, 2021

(30) Foreign Application Priority Data
Apr. 10, 2018 (JP) ................................. 2018-075697

(51) Int. Cl.
*B25J 9/10* (2006.01)
*B25J 13/08* (2006.01)
(Continued)

(52) U.S. Cl.
CPC ............. *B25J 9/1025* (2013.01); *B25J 9/108* (2013.01); *B25J 13/088* (2013.01); *B25J 17/00* (2013.01);
(Continued)

(58) Field of Classification Search
CPC ........ B25J 9/1025; B25J 9/108; B25J 13/088; B25J 17/00; B25J 19/0004; B25J 19/02;
(Continued)

(56) References Cited

U.S. PATENT DOCUMENTS 4,567,417 A * 1/1986 Francois .................... B25J 3/04
318/632
4,706,515 A * 11/1987 Yasukawa ................ B25J 9/042
198/349.6
(Continued)

FOREIGN PATENT DOCUMENTS

JP H11-132792 A 5/1999
JP 2013215081 A 10/2013
(Continued)

OTHER PUBLICATIONS

Wikipedia contributors. (Mar. 28, 2018). Rotary encoder. In Wikipedia, The Free Encyclopedia. Retrieved 18:14, Jul. 26, 2023, from https://en.wikipedia.org/w/index.php?title=Rotary_encoder&oldid=832933884 (Year: 2018).*
(Continued)

*Primary Examiner* — Joseph Brown
(74) *Attorney, Agent, or Firm* — Millen, White, Zelano & Branigan, P.C.; Ryan R. Pool

(57) ABSTRACT

A joint unit that is reduced in size including a plurality of angle detection mechanisms. A joint unit including an input-side support member for a rotationally driven input shaft, a decelerator that decelerates the input shaft to provide a deceleration output shaft, an output rotating body coupled to the deceleration output shaft including a strain generating portion that generates strain due to rotation transmitted by the deceleration output shaft, and an associated rotating body that is coupled to a output-side portion of the strain generating portion of the output rotating body to rotate together with the output rotating body disposed in a space
(Continued)

between the input-side support member and an input-side portion of the strain generating portion of the output rotating body.

20 Claims, 10 Drawing Sheets

(51) Int. Cl.
| | | |
|---|---|---|
| *B25J 17/00* | (2006.01) | |
| *B25J 19/00* | (2006.01) | |
| *G01B 7/30* | (2006.01) | |
| *G01B 11/26* | (2006.01) | |
| *G01D 5/14* | (2006.01) | |
| *G01D 5/26* | (2006.01) | |

(52) U.S. Cl.
CPC ............ *B25J 19/0004* (2013.01); *G01B 7/30* (2013.01); *G01B 11/26* (2013.01); *G01D 5/145* (2013.01); *G01D 5/26* (2013.01)

(58) Field of Classification Search
CPC ......... B25J 19/021; B25J 19/027; G01B 7/30; G01B 11/26; G01D 5/145; G01D 5/26
See application file for complete search history.

(56) References Cited

U.S. PATENT DOCUMENTS

| | | |
|---|---|---|
| 2013/0257230 A1 | 10/2013 | Park et al. |
| 2014/0305244 A1* | 10/2014 | Yamada ............... B25J 19/0062 74/479.01 |
| 2015/0053040 A1 | 2/2015 | Ueda et al. |
| 2018/0215050 A1* | 8/2018 | Kassow ................ B25J 17/025 |
| 2018/0328763 A1 | 11/2018 | Schautt et al. |

FOREIGN PATENT DOCUMENTS

| | | |
|---|---|---|
| JP | 2016-003947 A | 1/2016 |
| JP | 2017-508153 A | 3/2017 |
| JP | 2017-120243 A | 7/2017 |
| WO | 2013146371 A1 | 10/2013 |

OTHER PUBLICATIONS

International Search Report for PCT/JP2019/013559 dated Jun. 18, 2019.
English Translation of JP2017-120243, Publication Date: Jul. 6, 2017.
English Translation of JPH11-132792, Publication Date: May 21, 1999.
English Translation of JP2016-003947, Publication Date: Jan. 12, 2016.

* cited by examiner

JOINT UNIT, ROBOT ARM AND ROBOT

TECHNICAL FIELD

The present invention relates to a joint unit applicable to a joint portion of a robot arm or the like, for example.

BACKGROUND ART

In recent years, in robot arms for industrial use and the like, it is desired to reduce the size of a device so that the device can be used even in a restricted working space, and in particular, to reduce the size of a joint unit.

Patent Literature 1 discloses a hollow driving module that includes a hollow motor, a decelerator, a torque transmission unit, and the like, and is usable for a joint of an industrial robot.

CITATION LIST

Patent Literature

Patent Literature 1: Japanese Patent Laid-Open No. 2013-215081

SUMMARY OF INVENTION

Technical Problem

Incidentally, in this type of joint unit, an angle detection mechanism that detects a rotation angle may be provided on an input/output shaft, or an input-side or an output-side of the decelerator to perform a desired control and grasp a state. For example, the hollow driving module disclosed in Patent Literature 1 is provided with a first encoder that detects a rotation angle of the hollow motor, and a second encoder that detects a rotation angle of an output side of the decelerator.

However, when a structure in which a plurality of angle detection mechanisms are simply continuously arranged is adopted, like the hollow driving module disclosed in Patent Literature 1, a thickness in an axial direction increases, which may result in preventing the size reduction of the joint unit.

The present invention has been made to solve the above-described technical problem, and an object of the present invention is to provide a joint unit that can be reduced in size while being provided with a plurality of angle detection mechanisms.

Solution to Problem

The above-described technical problem can be solved by a joint unit having the following configuration, a robot arm, and a robot.

A joint unit according to the present invention includes an input-side support member that supports a rotationally driven input shaft, a decelerator that decelerates the input shaft to provide a deceleration output shaft, an output rotating body that is coupled to the deceleration output shaft, and includes a strain generating portion that generates strain due to rotation transmitted by the deceleration output shaft, and an associated rotating body that is coupled to an output-side portion of the strain generating portion of the output rotating body to rotate together with the output rotating body, and is disposed in a space between the input-side support member and an input-side portion of the strain generating portion of the output rotating body. In the joint unit, a first angle detection mechanism for detecting an angle formed between the associated rotating body and the input-side support member is provided for the associated rotating body and the input-side support member, and a second angle detection mechanism for detecting an angle formed between the associated rotating body and the input-side portion of the strain generating portion of the output rotating body is provided for the associated rotating body and the input-side portion.

According to such a configuration, the first angle detection mechanism and the second angle detection mechanism share the associated rotating body, whereby there can be provided a joint unit that is reduced in size while being provided with a plurality of angle detection mechanisms.

The joint unit may be configured in which the associated rotating body has a flat plate shape, the first angle detection mechanism is provided for one surface of the associated rotating body and the input-side support member, and the second angle detection mechanism is provided for the other surface of the associated rotating body and the input-side portion of the strain generating portion of the output rotating body.

Each of the first angle detection mechanism and the second angle detection mechanism may be a mechanism for detecting an angle in which one is attached with a code wheel on which a predetermined magnetic pattern is formed, and the other is attached with a magnetic reading element that reads the magnetic pattern so that the code wheel and the magnetic reading element face each other.

The joint unit may be configured in which in the first angle detection mechanism, the code wheel is fixed to the input-side support member, and the reading element is fixed to the associated rotating body to face the code wheel fixed to the input-side support member, and in the second angle detection mechanism, the code wheel is fixed to the input-side portion, and the reading element is fixed to the associated rotating body to face the code wheel fixed to the input-side portion.

The joint unit may be configured in which in the code wheel fixed to the input-side support member, the magnetic pattern is formed on an outer peripheral side surface of the input-side support member, and in the code wheel fixed to the input-side portion, the magnetic pattern is formed on an outer peripheral side surface of the input-side portion.

The joint unit may be configured in which in the code wheel fixed to the input-side support member, the magnetic pattern is formed on an end surface of the input-side support member perpendicular to a rotation direction of the input shaft, and in the code wheel fixed to the input-side portion, the magnetic pattern is formed on a surface perpendicular to a rotation axis of the input-side portion.

Each of the first angle detection mechanism and the second angle detection mechanism may be a mechanism for detecting an angle in which one is attached with a code wheel on which a predetermined optical pattern is formed, and the other is attached with an optical element that includes a light emitting element and a light receiving element, and reads the optical pattern, so that the code wheel and the optical reading element face each other.

The joint unit may be configured in which in the first angle detection mechanism, the code wheel is fixed to the input-side support member, and the optical element is fixed to the associated rotating body to face the code wheel fixed to the input-side support member, and in the second angle detection mechanism, the code wheel is fixed to the input-side portion, and the optical element is fixed to the associated rotating body to face the code wheel fixed to the input-side portion.

The joint unit may be configured in which each of the first angle detection mechanism and the second angle detection mechanism is an angle detection mechanism comprising a light emitting element, a code wheel on which a predetermined optical pattern is formed, and a light receiving element that receives a light emitted from the light emitting element and obtained via the code wheel, and reads the optical pattern, in the first angle detection mechanism, the code wheel is fixed to the input-side support member, in the second angle detection mechanism, the code wheel is fixed to the input-side portion, the associated rotating body includes a flat plate portion disposed in a space between the input-side support member and the input-side portion of the strain generating portion of the output rotating body, a first holding piece portion extending from the flat plate portion, and disposed on a back side of the code wheel to sandwich the code wheel attached to the input-side support member, and a second holding piece portion extending from the flat plate portion, and disposed on the back side of the code wheel to sandwich the code wheel attached to the input-side portion, in the first angle detection mechanism, the light emitting element is fixed to the flat plate portion, and the light receiving element is fixed to the first holding piece portion, whereby the light from the light emitting element passes through the code wheel fixed to the input-side support member, and is received by the light receiving element, and in the second angle detection mechanism, the light emitting element is fixed to the flat plate portion, and the light receiving element is fixed to the second holding piece portion, whereby the light from the light emitting element passes through the code wheel fixed to the input-side portion, and is received by the light receiving element.

The joint unit may be configured so that an angle detection accuracy of the second angle detection mechanism is higher than the angle detection accuracy of the first angle detection mechanism.

The joint unit may be configured in which one of the first angle detection mechanism and the second angle detection mechanism is a magnetic-type angle detection mechanism, and the other is an optical-type angle detection mechanism.

The joint unit may be configured in which the input shaft is coupled to an input-side member of the decelerator and is supported by the input-side support member, the deceleration output shaft is coupled to an output-side member of the decelerator and is supported by the input shaft, the output rotating body is coupled to the deceleration output shaft and faces the input-side support member, and the associated rotating body is disposed between a surface facing the output rotating body of the input-side support member and a surface facing the input-side support member of the output rotating body.

The joint unit may be configured in which the input shaft is hollow, and the deceleration output shaft is inserted into the hollow input shaft and is supported with respect to an inner surface of the input shaft.

The decelerator may be a wave gear decelerator.

The joint unit may be configured in which an attaching portion of a predetermined braking device that brakes rotation of the deceleration output shaft is provided on the other end side opposite to a coupling end of the output rotating body with the deceleration output shaft.

The joint unit may be configured in which a third angle detection mechanism that detects a rotation angle of the input shaft with respect to the input support member is provided on the other end side opposite to a coupling end of the output rotating body with the input shaft.

The joint unit may be configured in which the output rotating body includes a small-diameter annular portion coupled with the deceleration output shaft in a center thereof, and a large-diameter annular portion having the same center as the small-diameter annular portion, and coupled with the small-diameter annular portion via the strain generating portion extending from the small-diameter annular portion in a radial direction, the large-diameter annular portion and the small-diameter annular portion have large-diameter annular portion side holes and small-diameter annular portion side holes, respectively, so that the large-diameter annular portion side hole and the small-diameter annular portion side hole are linearly arranged in the radial direction, a bolt is fixed to the small-diameter annular portion side hole and a head of the bolt is enclosed by the large-diameter annular portion side hole having an inner diameter slightly larger than an outer diameter of the bolt, whereby, when strain is generated in the strain generating portion due to rotation of the output rotating body, the head of the bolt is in contact with an inner wall of the large-diameter annular portion side hole to restrict the strain.

The joint unit may be configured in which the decelerator is a wave gear decelerator including a wave generator, a flex spline, and a circular spline, the input shaft is hollow, and one end portion of the input shaft is coupled to the wave generator and is supported by the input-side support member via a first bearing, the deceleration output shaft is coupled to an output side of the flex spline and is supported by the input-side support member via a second bearing, and is inserted into the hollow input shaft and is supported by a third bearing with respect to the input shaft in a vicinity of an end portion opposite to the end portion of the input shaft, and each of the first bearing, the second bearing, and the third bearing is a sealed bearing.

The joint unit may be configured to further include an abnormality detection part that detects an abnormality of the output rotating body based on an angle obtained by the second angle detection mechanism.

Moreover, the present invention can be regarded as a robot arm provided with the above-described joint unit.

Furthermore, the present invention can be regarded as a robot provided with the above-described joint unit.

Advantageous Effect of Invention

According to the present invention, there can be provided a joint unit that is reduced in size while being provided with a plurality of angle detection mechanisms.

DESCRIPTION OF EMBODIMENTS

Hereinafter, preferred embodiments of the present invention will be described with reference to the accompanying FIG. 1 to FIG. 10.

1. First Embodiment

1.1 Robot Arm

First, a robot arm 1 in which a joint unit 100 according to the present embodiment is applied to a joint portion will be described with reference to FIG. 1 and FIG. 2.

Figure 1:
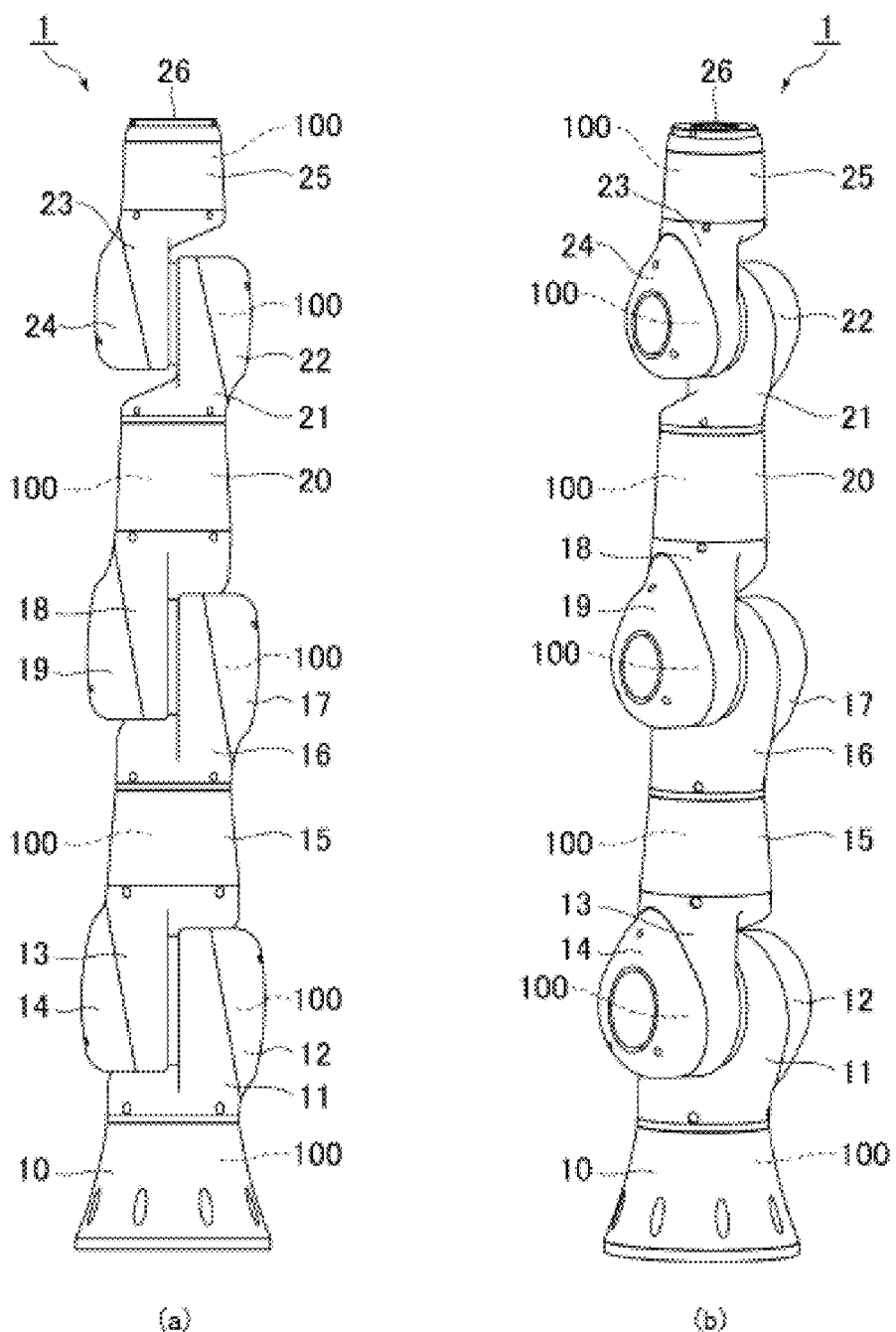
FIG. 1 is an external view of a robot arm.

FIG. 1 is an external view of the robot arm 1, in which FIG. 1(*a*) is a front view of the robot arm 1, and FIG. 1(*b*) is a perspective view of the robot arm 1. As is clear from the figure, the robot arm 1 has a circular cross section, and includes seven joint units 100 therein between a base member 10 and an end effector attaching portion 26 at a distal end.

A first link 11 is coupled to an upper end of the base member 10 disposed at a proximal end of the robot arm 1 to be rotatable about an axis, and the joint unit 100 (not illustrated) for rotating the first link 11 about the axis is disposed inside the base member 10. In addition, the first link 11 is rotatably linked to a second link 13 via the joint unit 100 (not illustrated), and a first cover 12 and a second cover 14 are provided on respective outer surfaces outside a coupling portion between the first link 11 and the second link 13 via the joint unit 100. A third link 16 is coupled to the upper end of a first linkage member 15 linked to the second link 13 to be rotatable about the axis, and the joint unit 100 (not illustrated) for rotating the third link 16 about the axis is disposed inside the first linkage member 15. In addition, the third link 16 is rotatably linked to a fourth link 18 via the joint unit 100 (not illustrated), and a third cover 17 and a fourth cover 19 are provided on respective outer surfaces outside a coupling portion between the third link 16 and the fourth link 18 via the joint unit 100. A fifth link 21 is coupled to the upper end of a second linkage member 20 linked to the fourth link 18 to be rotatable about the axis, and the joint unit 100 (not illustrated) for rotating the fifth link 21 about the axis is disposed inside the second linkage member 20. In addition, the fifth link 21 is rotatably linked to a sixth link 23 via the joint unit 100 (not illustrated), and a fifth cover 22 and a sixth cover 24 are provided on respective outer surfaces outside a coupling portion between the fifth link 21 and the sixth link 23 via the joint unit 100. An end effector connecting portion 26 for connecting with an end effector such as a hand or a gripper is coupled to the upper end of a distal end link 25 linked to the sixth link 23 to be rotatable about the axis, and the joint unit 100 (not illustrated) for rotating the end effector connecting portion 25 about the axis is disposed inside the distal end link 25.

Figure 2:
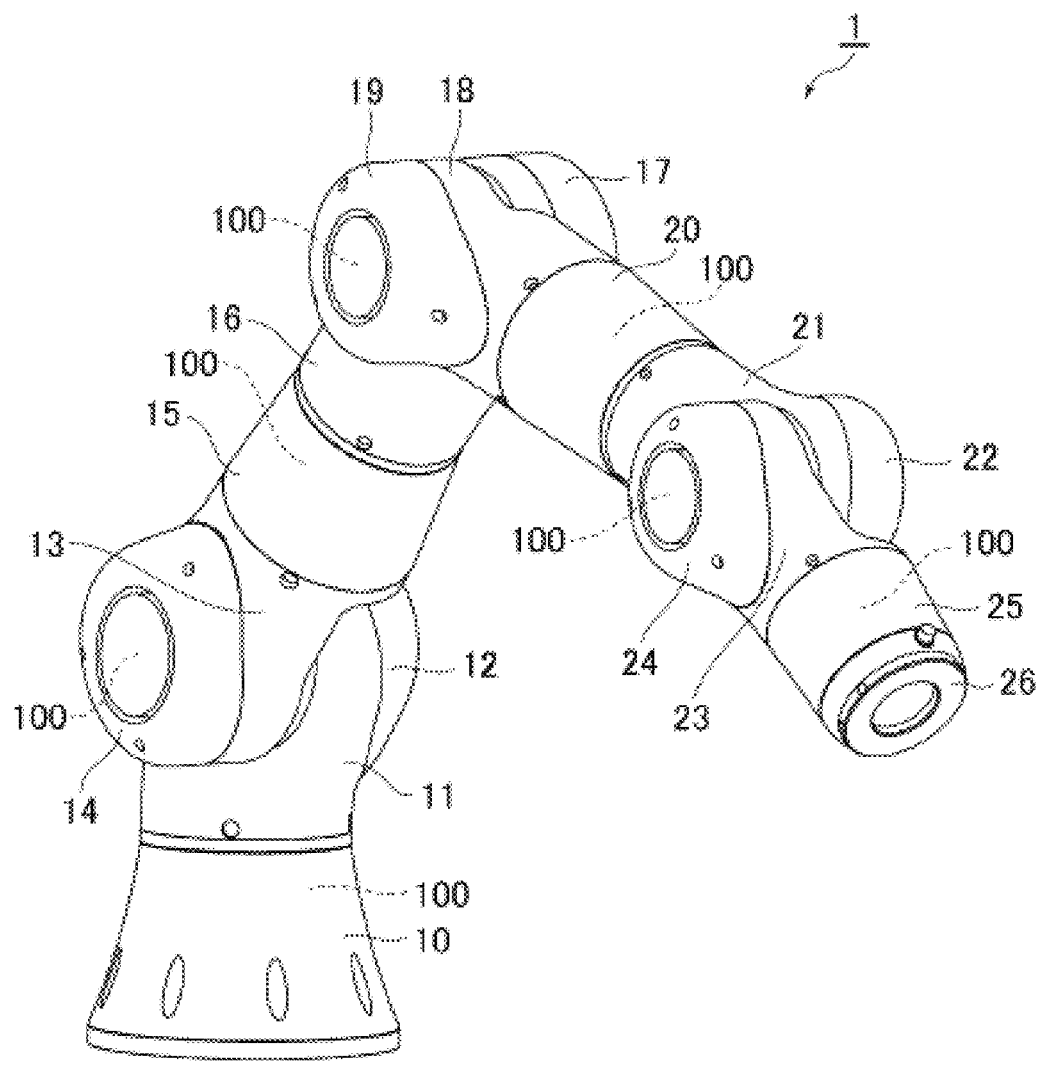
FIG. 2 is an external perspective view illustrating the robot arm in a state where each joint is bent.

FIG. 2 is an external perspective view illustrating the robot arm 1 in a state where each joint is bent. As is clear from the figure, the robot arm 1 operates each joint unit 100 provided inside the corresponding joint portion of the robot arm 1, according to a command of a control unit (not illustrated), whereby each joint can be bent flexibly.

Note that, the present embodiment is described assuming that all of the joint units 100 provided in the robot arm 1 are the same, but is not limited to this form. Accordingly, for example, the joint units 100 may vary in size individually according to a space of each joint, a required torque, and the like, while being substantially the same in structure.

1.2 Joint Unit

Next, the joint units 100 disposed inside the robot arm 1 will be described with reference to FIG. 3 to FIG. 5.

Figure 3:
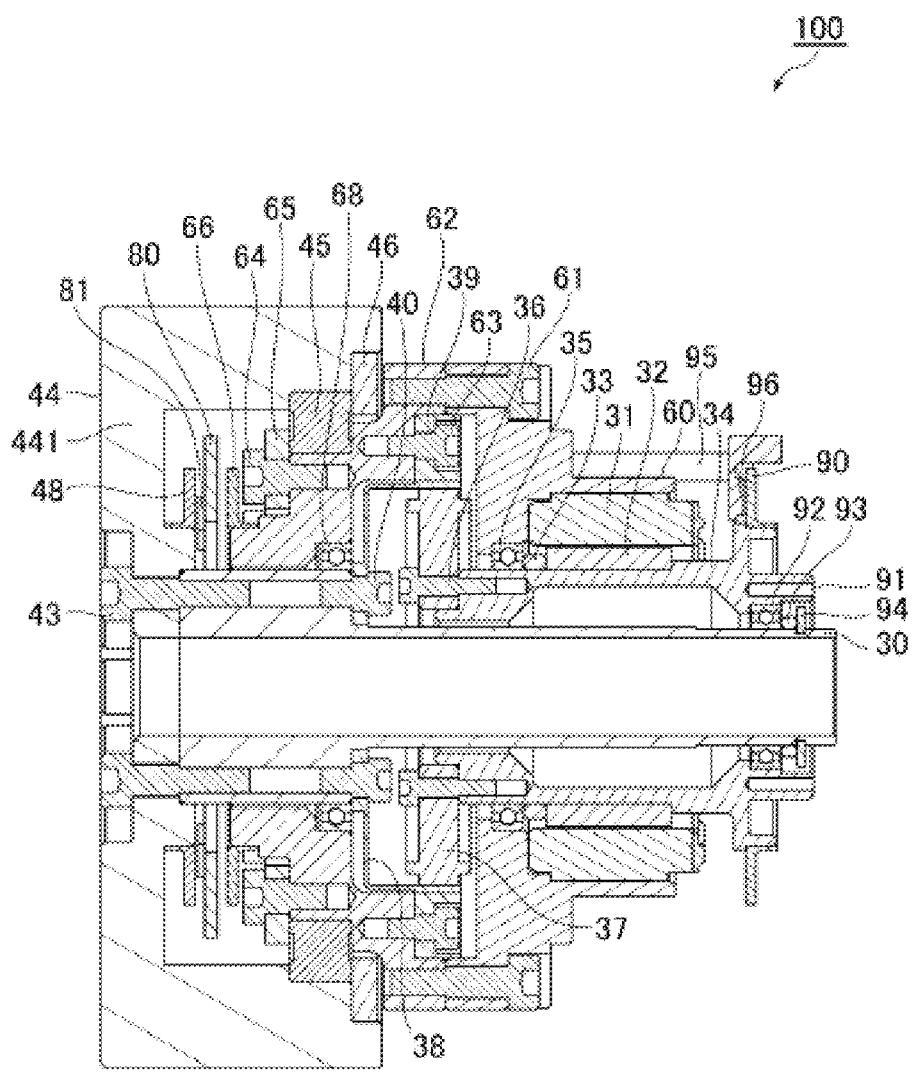
FIG. 3 is a cross-sectional view illustrating a structure of a joint unit.

FIG. 3 is a central cross-sectional view of the joint unit 100. As is clear from the figure, generally speaking, the joint unit 100 includes hollow input-side support members (60 to 62), hollow motors (31, 32) that are disposed inside the hollow input-side support members (60 to 62), decelerators (37 to 39) that are coupled to a hollow rotary shaft 34 fixed to a hollow rotor 32 of the hollow motor inside the hollow input-side support members (60 to 62), a decelerator output shaft 30 that is linked to outputs of the decelerators (37 to 39) and has one end supported by an inner surface of the hollow rotary shaft 34, and an output rotating body 44 that is linked to the other end of the decelerator output shaft 30, and the members share the same center or the same rotational axis. Note that the first input-side support member 60 is linked, directly or indirectly, to an input-side link (e.g., the first link 11), whereas the output rotating body 44 is linked, directly or indirectly, to an output-side link (e.g., the second link 13).

The input-side support members (60 to 62) are configured in which a first input-side support member 60 that supports the hollow motors (31, 32) and the decelerator output shaft 30 is linked, via a bolt 61, to a second input-side support member 62 that supports the decelerators (37 to 39), the decelerator output shaft 30, and the output rotating body 44. Note that a columnar extending member 95 protrudes from an outer surface of the first input-side support member 60, and a third magnetic reading element 96 that reads a predetermined magnetic pattern formed on a third code wheel 90 (described later) forming a part of a magnetic encoder is provided on a distal end surface of the columnar extending member 95, thereby capable of detecting a rotation angle of the hollow rotor 32 with respect to the first input-side support member 60.

The hollow motors (31, 32) include a stator 31 that is fixed to an inner periphery of the first input-side support member 60, and the hollow rotor 32 that is disposed inside the stator 31 and rotates. The hollow rotary shaft 34 is fixed on the further inner peripheral side of the hollow rotor 32, so that the hollow rotary shaft 34 rotates together with the hollow rotor 32. At this time, the hollow rotary shaft 34 is supported by the first input-side support member 60 via a first sealed bearing 35 between the hollow motors (31, 32) and the decelerators (37 to 39). In addition, the third code wheel 90 on which a predetermined magnetic pattern is formed, the third code wheel 90 forming a part of the magnetic encoder, is provided on an outer surface of an end portion of the hollow rotary shaft 34. Furthermore, a hole 91 for attaching another device is provided in the end portion of the hollow rotary shaft 34, which enables a braking unit or the like to be retrofitted, for example. Note that a predetermined spacer member 33 is provided between the hollow rotor 32 and the first sealed bearing.

The decelerators (37 to 39) are harmonic drives (registered trademark), and include a wave generator 37 that is disposed in the center, a cup-shaped flex spline 38 that is disposed on an outer periphery of the wave generator 37, and a circular spline 39 that is disposed on an outer periphery of the flex spline 38 and is fixed on an inner peripheral side of the second input-side support member 62 via a bolt 63. The wave generator 37 is linked to one end of the hollow rotary shaft 34 via a bolt 36, and the flex spline 38 as outputs of the decelerators (37 to 39) is linked to one end of the decelerator output shaft 30 via a bolt 40.

Figure 5:
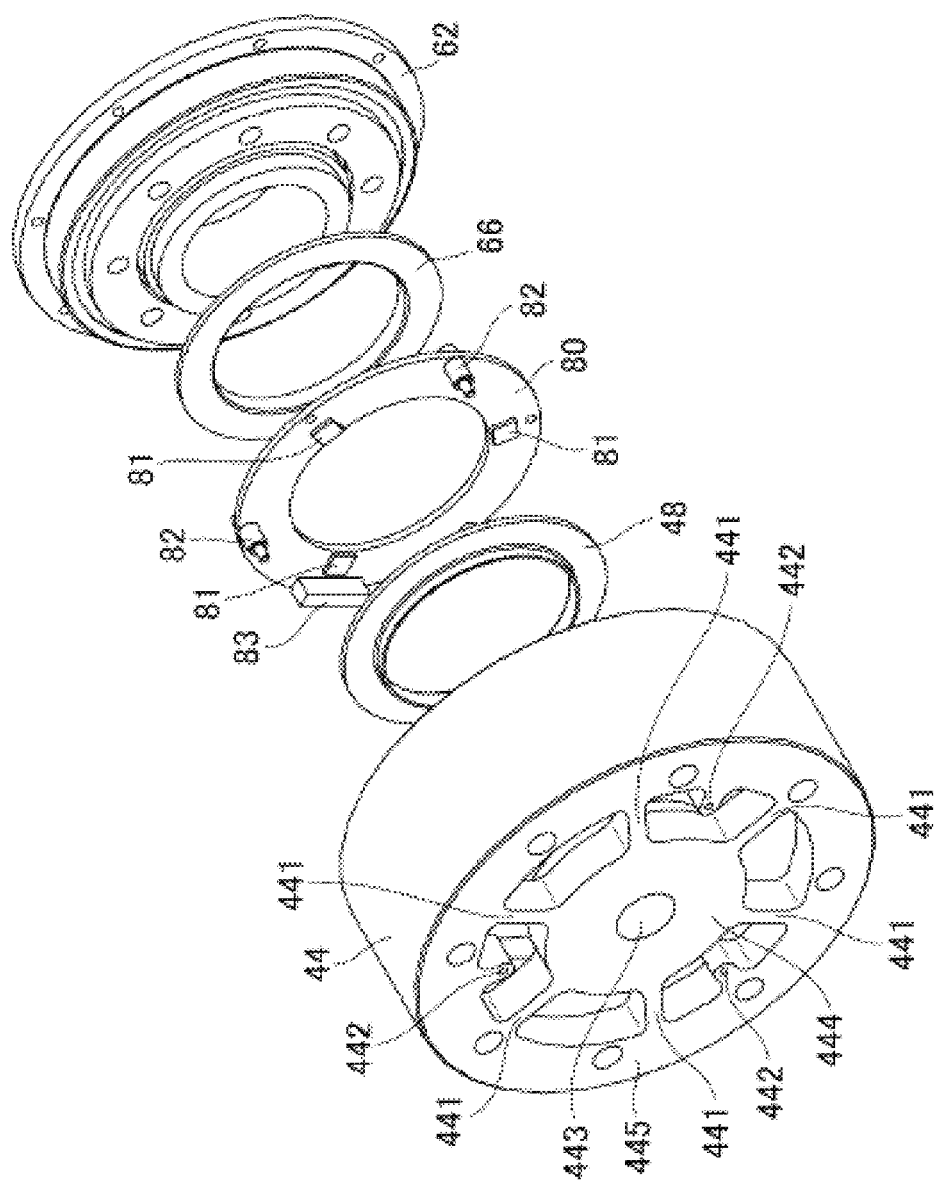
FIG. 5 is a partial exploded perspective view illustrating the joint unit.

The output rotating body 44 includes a small-diameter annular portion 444 that has a hole 443 in the center, and a large-diameter annular portion 445 that is linked to the small-diameter annular portion 444 via a strain generating portion 441 that extends in a radial direction from the small-diameter annular portion 444 and generates strain due to the rotation of the output rotating body 44 (see FIG. 5). The small-diameter annular portion 444 is linked to one end of the decelerator output shaft 30 via a bolt 43. At this time, the decelerator output shaft 30 is supported on an inner surface side of the second input-side support member 62 via a second sealed bearing 68 in the vicinity of a coupling portion between the decelerator output shaft 30 and the flex spline 38. The output rotating body 44 is rotatably supported on an outer periphery of the second input-side support member 62 via a cross roller bearing 45. This cross roller bearing 45 is fixed with a bolt 64 by being sandwiched between a first stopper member 65 fixed to a step portion of the second input-side support member 62 and a second stopper member 46 fixed to an inner peripheral side step portion of the output rotating body 44.

The decelerator output shaft 30 linked to the small-diameter annular portion 444 of the output rotating body 44 passes through the inside of the wave generator 37 of the decelerators (37 to 39) and the hollow rotary shaft 34, and then, in the vicinity of an end portion opposite to a linking portion with the small-diameter annular portion 444, the decelerator output shaft 30 is supported by an inner peripheral surface in the vicinity of the end portion of the hollow rotary shaft 34 via a third sealed bearing 92. In this end portion, a ring 94 fixed to a step portion provided on the shaft member is in contact with a spacer 93, so that the displacement in the axial direction is restricted.

A first code wheel 66 on which a predetermined magnetic pattern is formed, the first code wheel 66 forming a part of the magnetic encoder, is provided in an end portion on the output rotating body 44 side of the second input-side support member 62, and a second code wheel 48 on which a predetermined magnetic pattern is formed, the second code wheel 48 forming a part of the magnetic encoder, is provided also in an end portion on the inner surface side of the output rotating body 44 facing the end portion on the output rotating body 44 side of the second input-side support member 62. On the other hand, an annular thin plate 80 that is disposed between the first code wheel 66 and the second code wheel 48 and rotates together with the large-diameter annular portion 445 is coupled to a side of a coupling surface of the large-diameter annular portion 445 of the output rotating body 44 to the decelerator output shaft 30.

Three magnetic reading elements 81 that are formed of hall elements or the like and equidistantly arranged at 120 degrees on the circumference are provided on a surface facing the second code wheel 48 in the annular thin plate 80 (see FIG. 5). In addition, one magnetic reading element 81 is provided on a surface facing the first code wheel 66 in the annular thin plate 80.

A magnetic encoder is formed of the first code wheel 66 and the second code wheel 48, and the magnetic reading elements 81 provided on both of front and rear surfaces of the thin plate 80, thereby capable of detecting an angle formed by the large-diameter annular portion 445 with respect to the second input-side support member 62 and an angle formed by the large-diameter annular portion 445 with respect to the small-diameter annular portion 444.

According to the above-described configuration in which the three magnetic reading elements 81 are provided to be arranged at an angle of 120 degrees with respect to one another, the angles can be detected accurately with the reduced influence of bending of the shaft or the like, by obtaining the arithmetic mean of detection values of the respective magnetic reading elements 81.

In addition, in the above-described configuration, when the detection accuracy is required, such as the angle formed by the large-diameter annular portion 445 with respect to the small-diameter annular portion 444, a plurality of angle detectors are provided. On the other hand, when a large change in angle is estimated in advance, such as the angle formed by the large-diameter annular portion 445 with respect to the second input-side support member 62, one angle detector is provided. According to such a configuration, since a necessary and sufficient sensor can be disposed according to necessary accuracy, the economical design can be achieved.

Note that the present embodiment provides a configuration in which the number of magnetic reading elements 81 provided on the front surface of the annular thin plate 80 is different from that provided on the rear surface of the annular thin plate 80, but is not limited to such a configuration. Accordingly, for example, three magnetic reading elements may be provided on each of both surfaces, or one magnetic reading element may be provided on each of both surfaces.

A configuration forming an encoder will be described with reference to FIG. 4 and FIG. 5. FIG. 4 is a partially enlarged cross-sectional view mainly illustrating an encoder portion provided between the output rotating body 44 and the second input-side support member 62. FIG. 5 is a partial exploded perspective view especially illustrating a configuration forming the encoder. It should be noted that FIG. 4 illustrates a cross section taken so as to include a fixing portion 82 of the annular thin plate 80 to the large-diameter annular portion 445, to facilitate the understanding, and the cross section of FIG. 4 is different from the cross section of FIG. 3.

Figure 4:
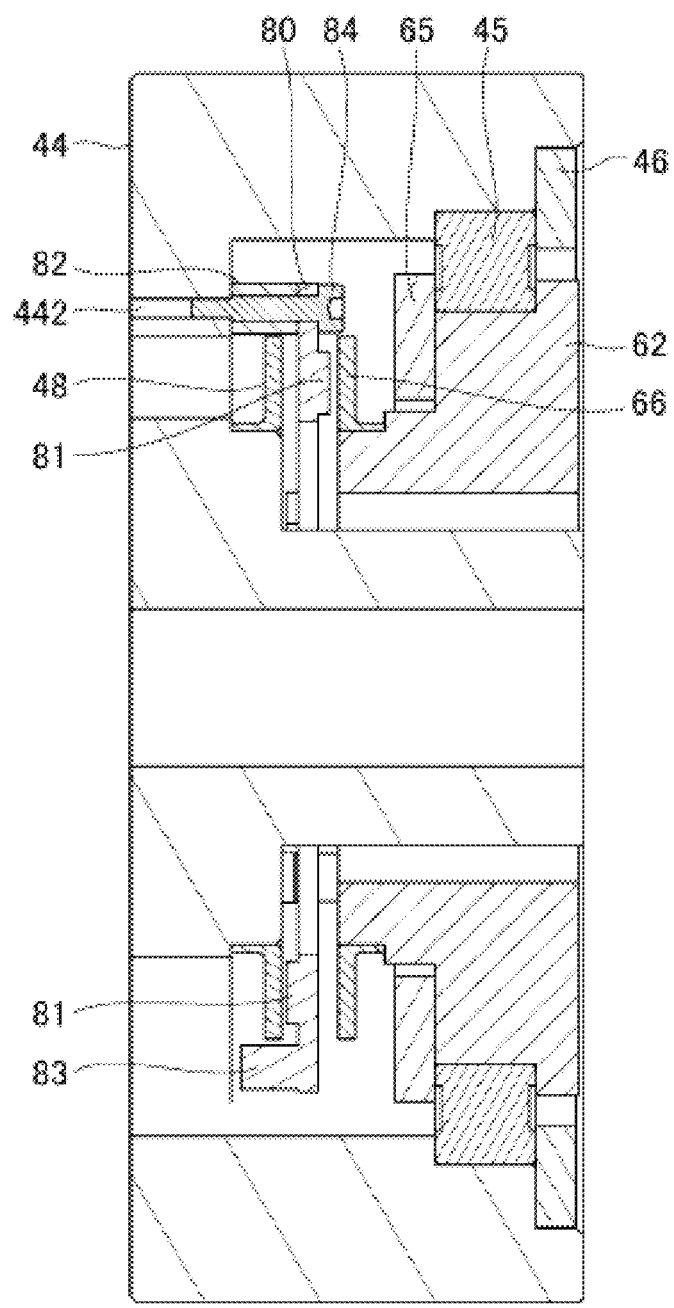
FIG. 4 is a partially enlarged view illustrating a cross section of the joint unit.

As is clear from FIG. 4 and FIG. 5, three fixing portions 82 are provided on a surface facing the second code wheel 48 in the annular thin plate 80, so as to be arranged at an angle of 120 degrees with respect to one another at positions shifted by about 60 degrees from the respective magnetic reading elements 81, and the fixing portions 82 are aligned with through holes 442 provided in a rib on the inner peripheral side of the large-diameter annular portion 445 to be fixed with bolts 84, whereby the large-diameter annular portion 445 integrally rotates with the annular thin plate 80. In addition, a connector 83 for signal connection is also provided on the annular thin plate 80.

Note that, in the present embodiment, the magnetic reading elements 81 on the front surface of the annular thin plate 80 are arranged to be shifted by a given extent (e.g., 60 degrees) with respect to the magnetic reading elements 81 on the rear surface of the annular thin plate 80, so that positions of the magnetic reading elements 81 on the front surface do not coincide with those on the rear surface. According to such a configuration, heat dissipation mechanisms such as thermal vias provided on the annular thin plate 80 on the back side of the magnetic reading elements 81 do not interfere with one another.

According to the above-described configuration, the angle formed by the large-diameter annular portion 445 with respect to the second input-side support member 62 can be detected, and therefore, for example, an absolute angle of the joint in a state where a load is applied can be detected, and abnormalities of the hollow motors (31, 32), the decelerators (37 to 39), and the like can be detected. On the other hand, the angle formed by the large-diameter annular portion 445 with respect to the small-diameter annular portion 444 can be detected, and therefore, for example, a torque loaded to the output rotating body 44 can be detected, and an abnormality of the output rotating body 44 can be detected.

In addition, according to the above-described configuration, the harmonic drives (registered trademark) (37 to 39) are arranged by being sandwiched by the first sealed bearing 35, the second sealed bearing 68, and the third sealed bearing 92. Accordingly, this can prevent grease used for the harmonic drives (registered trademark) (37 to 39) from leaking to the outside of the joint unit 100. Furthermore, the grease is prevented from leaking using the sealed bearings instead of oil seal or the like, and therefore, there is no concern about friction or the like with respect to each rotating body, the friction being caused by the oil seal.

Note that the decelerator is not limited to the harmonic drive (registered trademark), and may be another wave gear decelerator.

2. Second Embodiment

Next, a second embodiment will be described with reference to FIG. 6 to FIG. 8. In the second embodiment, a braking unit 200 is further attached to the joint unit 100 according to the first embodiment. Note that, in the second embodiment, the same components as those of the first embodiment will be assigned the same reference numerals.

Figure 6:
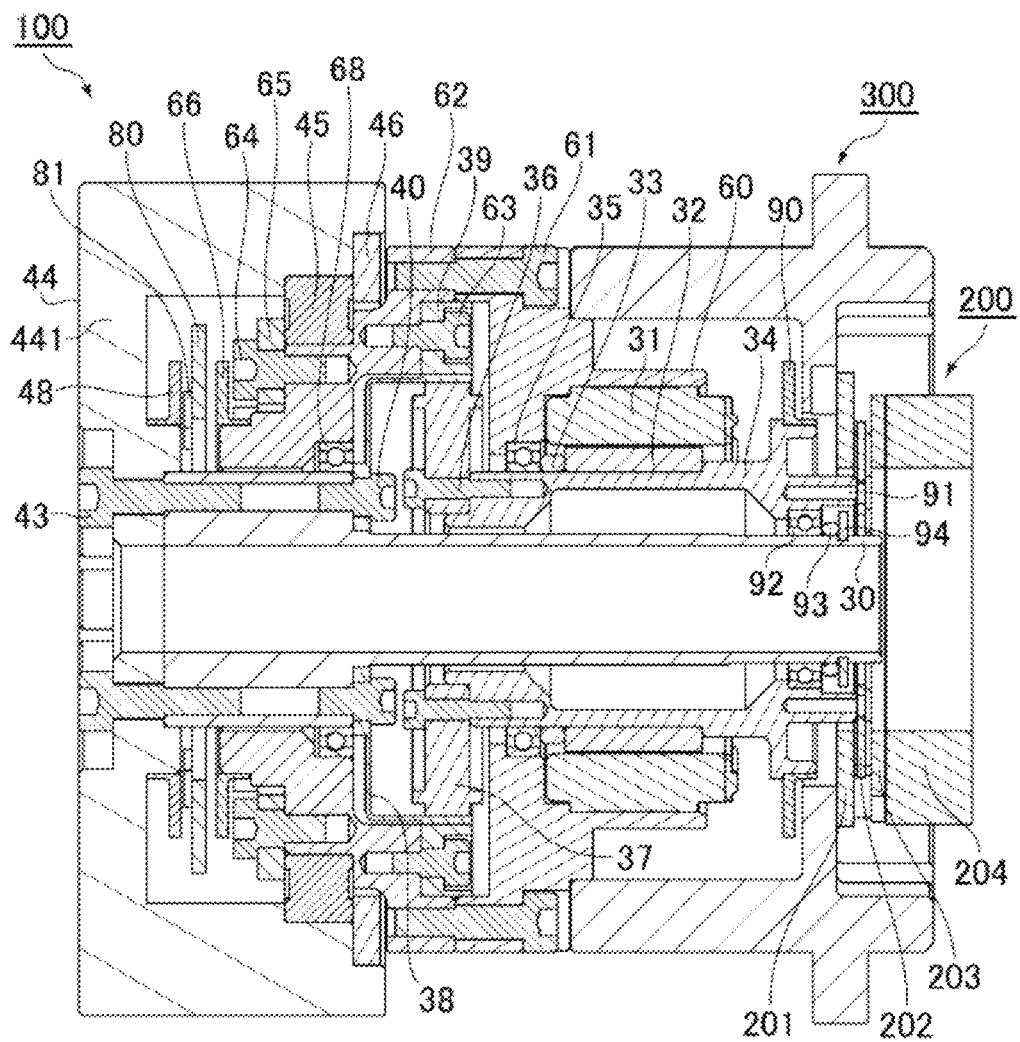
FIG. 6 is a cross-sectional view illustrating a structure of a joint unit to which a braking unit is attached.
Figure 7:
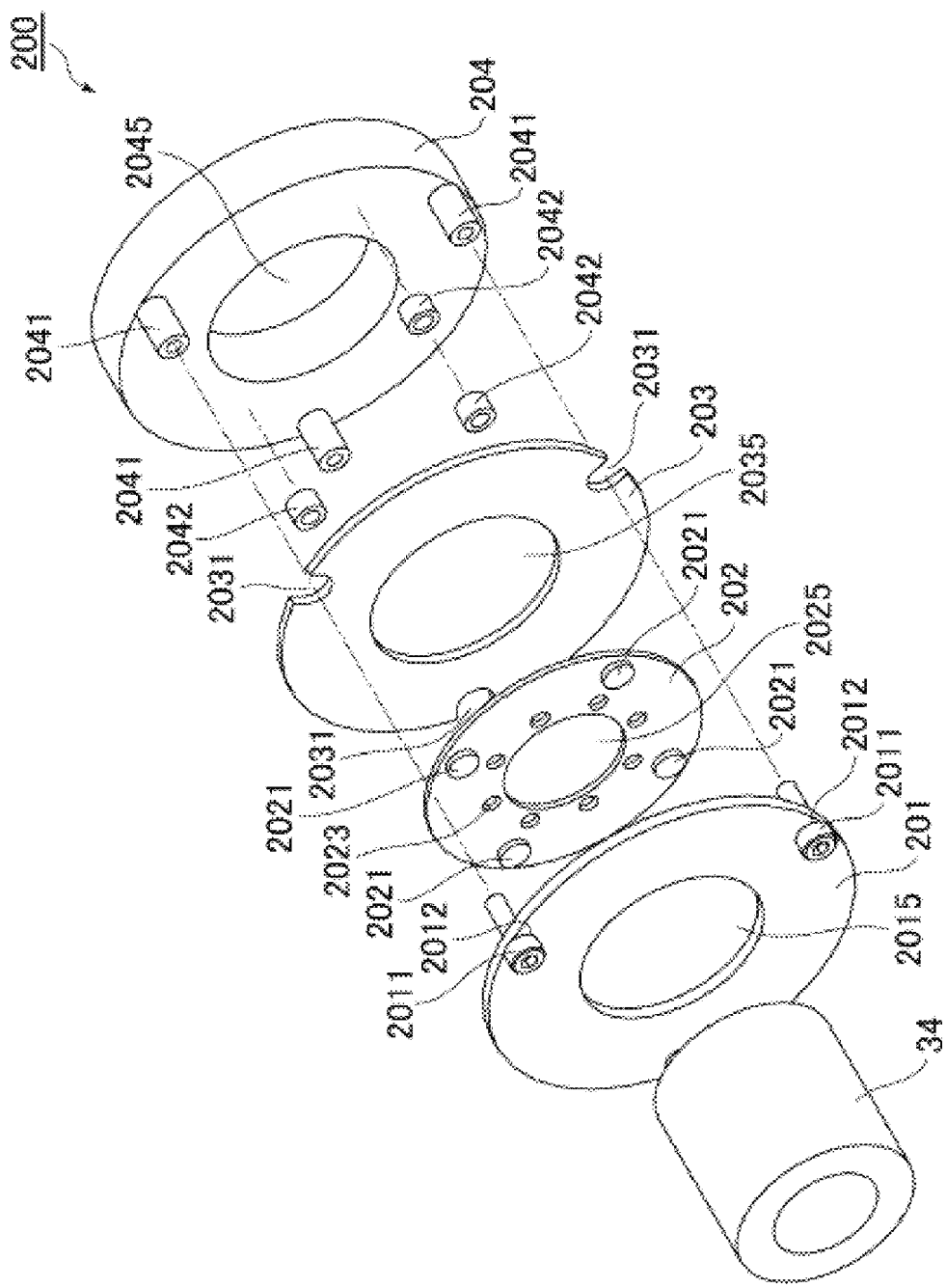
FIG. 7 is an exploded perspective view of a braking unit.

FIG. 6 is a cross-sectional view illustrating a structure of the joint unit 100 to which the braking unit 200 is attached. As is clear from the figure, the braking unit 200 is attached to the hole 91 in the end portion of the hollow rotary shaft 34 of the joint unit 100, and outer surfaces of the first input-side support member 60 and the braking unit 200 are further covered by a housing 300.

A configuration of the braking unit 200 will be described with reference to FIG. 6 and FIG. 7. FIG. 7 is an exploded perspective view of the braking unit 200. As is clear from the figure, the braking unit 200 includes a friction plate 202 that is linked to one end of the hollow rotary shaft 34 through linkage holes 2023, and has a hole 2025 in the center thereof and friction elements 2021 on a front surface thereof, an annular fixing plate 201 that has a hole 2015 in the center thereof, and is fixed to a drive part 204 and the housing 300, an annular movable plate 203 that has a hole 2035 in the center thereof, and moves in the axial direction thereof to press the friction plate 202 against a front surface of the annular fixing plate 201, and the drive part 204 that has a hole 2045 in the center thereof, is coupled to the annular fixing plate 201 by fastening coupling portions 2041 in the vicinity of the circumference thereof and coupling holes 2012 with bolts 2011, respectively, and drives the annular movable plate 201 by an electromagnet stored thereinside. Note that spring members 2042 are arranged between the drive part 204 and annular movable plate 203, and the friction plate 202 is urged to be pressed against the annular fixing plate 201 in a non-magnetic force state. That is, the annular movable plate 203 moves between the annular fixing plate 201 and the drive part 204, and the friction plate 202 provided at the end portion of the hollow rotary shaft 34 is selectively pressed against the annular fixing plate 201, whereby the rotation of the hollow rotary shaft 34, which is the output before deceleration, is selectively braked.

Figure 8:
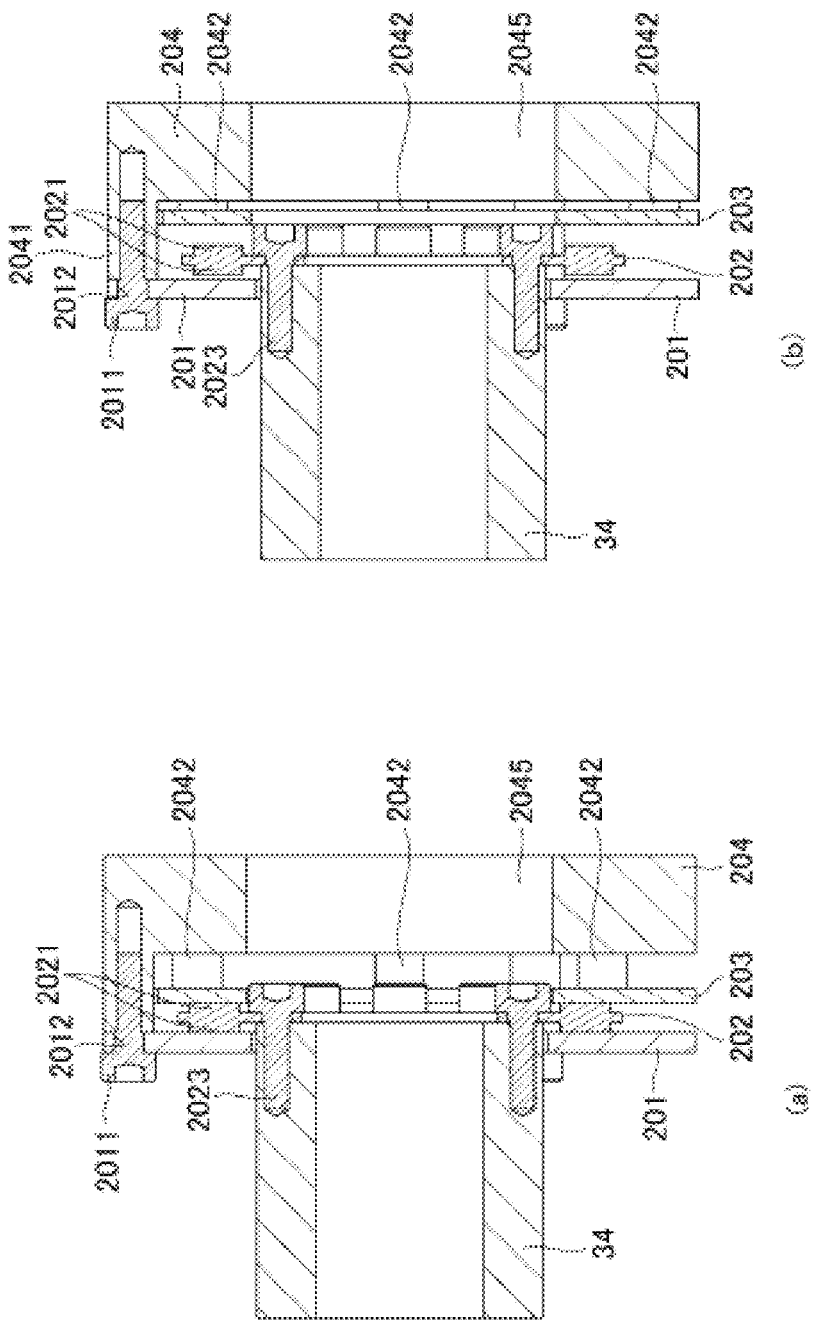
FIG. 8 is an explanatory diagram of an operation relating to the braking unit.

FIG. 8 is an explanatory diagram relating to a rotational braking operation of the hollow rotary shaft 34 using the braking unit 200.

FIG. 8(a) illustrates a state when the braking unit 200 reaches a non-magnetic force state in an off state of the drive part 204 in the braking unit 200. As is clear from the figure, in the non-magnetic force state, the annular movable plate 203 is pressed against the friction plate 202 by the spring members 2042, whereby the hollow rotary shaft 34 is braked.

FIG. 8(b) illustrates a state in which the annular movable plate 203 is attracted toward the drive part 204 by the electromagnetic in the drive part in an on state of the drive part 204 in the braking unit 200. As is clear from the figure, in the on state of the drive part 204, the annular movable plate 203 is attracted toward the drive part 204 against urging forces of the spring members 2042, whereby the friction plate 202 reaches a no-load condition and rotates together with the hollow rotary shaft 34. That is, the hollow rotary shaft 34 is not braked.

According to such a configuration, the hollow rotary shaft 34 protrudes from the end portion on a side opposite to the output rotating body 44 of the joint unit 100, which enables the braking unit 200 and the like to be easily retrofitted.

3. Variation

The present invention is not limited to the above-described embodiments, and various variations may be made as follows, for example.

3.1 Variation Relating to Output Rotating Body

Figure 9:
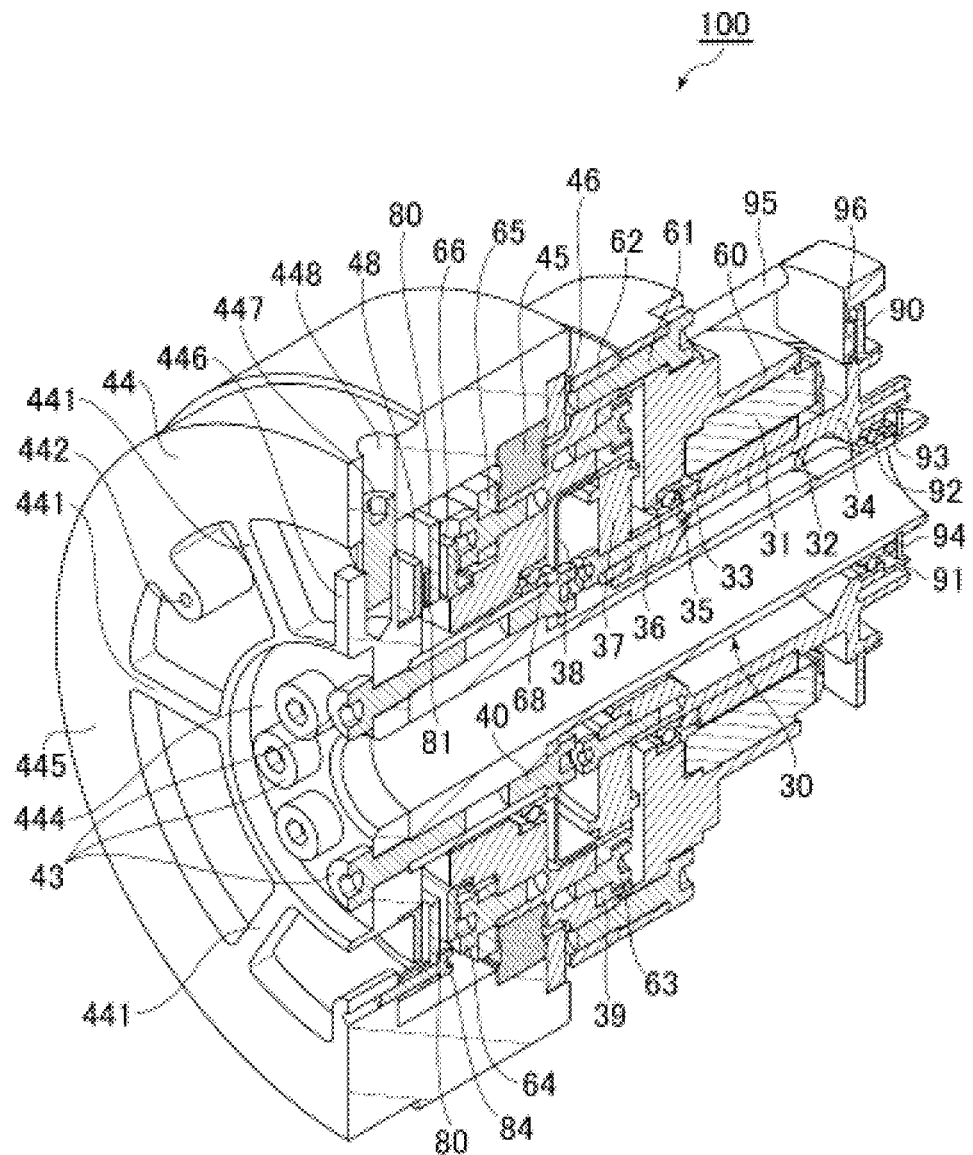
FIG. 9 is a cross-sectional view of a joint unit according to a variation.

FIG. 9 is an explanatory diagram illustrating a variation, and in particular, a cross-sectional view of a joint unit 100 having a torque limiter structure. Note that in the figure, the same components as those of the first embodiment will be assigned the same reference numerals.

As is clear from the figure, a small-diameter annular portion 444 of an output rotating body 44 extends in a radial direction, and the extending portion 446 is threaded to fix a bolt 447. In addition, a through hole 448 having an inner diameter slightly larger than an outer diameter of the bolt 447 is provided in the radial direction in a peripheral side surface of a large-diameter annular portion 445. When the bolt 447 is inserted into the through hole 448 to be fixed to the extending portion 446 in this state, a threaded portion of the bolt 447 is fixed to the small-diameter annular portion 444, and a head side surface of the bolt 447 is disposed without being in contact with an inner peripheral surface of the through hole 448.

According to such a configuration, even when strain is generated in a strain generating portion 441 due to the rotation of the output rotating body 44, a torque limiter can be achieved in a simple structure in which, when the strain is generated at a predetermined level or more, the bolt 447 is inclined and the head thereof is in contact with the inner peripheral surface of the through hole 448, thereby suppressing the deformation beyond a predetermined level.

3.2 Variations Relating to Encoder Arrangement

Figure 10:
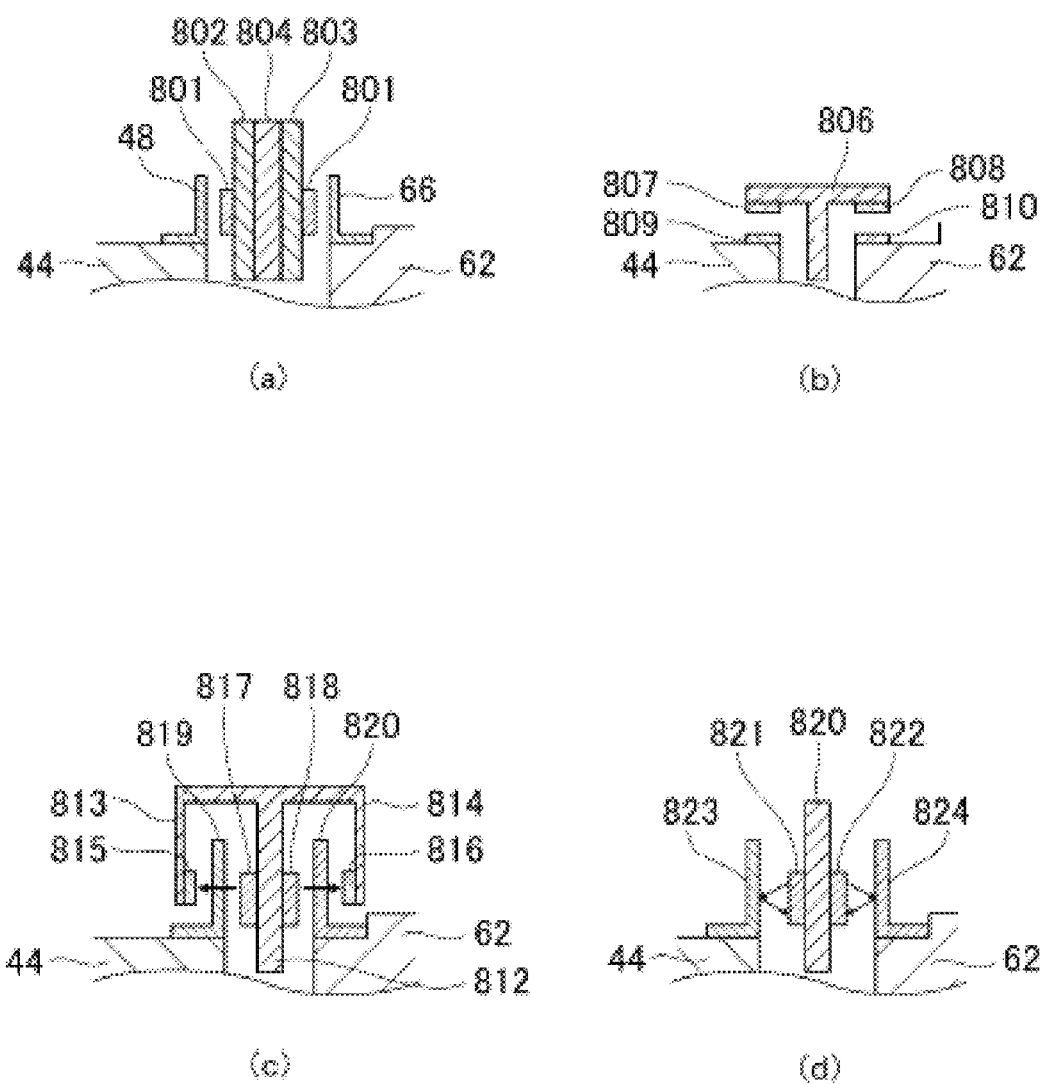
FIG. 10 is an explanatory diagram relating to variations of arrangement of encoders.

FIG. 10 is an explanatory diagram relating to variations of the arrangement of the encoders. Note that in the figure, the same components as those of the first embodiment will be assigned the same reference numerals.

FIG. 10(a) is an explanatory diagram relating to a variation (No. 1). In this variation, a magnetic shield member 804 such as a steel plate is provided at the center of the annular thin plate, and a first annular thin plate 802 and a second annular thin plate 803 are joined to the front and rear of the magnetic shield member 804, respectively.

According to such a configuration, since a magnetic reading element 801 attached to the first annular thin plate 802 and a magnetic reading element 801 attached to the second annular thin plate 803 are not affected by the magnetism of the respective rear surfaces, magnetic patterns on code wheels 48 and 66 can be detected with high accuracy, even when a gap between the output rotating body 44 and a second input-side support member 62 is very small, for example.

FIG. 10(b) is a partial cross-sectional view illustrating a configuration in which a radial-type magnetic encoder is used, instead of an axial-type magnetic encoder. As is clear from the figure, an annular thin plate 806 has a T-shape in cross section in the vicinity of the circumference thereof, and a first magnetic reading element 807 and a second magnetic reading element 808 are arranged on left and right sides of the inner peripheral side of the short side of the T-shape, respectively. In addition, a first code wheel 809 is provided on an outer peripheral surface of an end portion of the output rotating body 44 to face the first magnetic reading element 807, and a second code wheel 810 is provided on an outer peripheral surface of an end portion of the second input-side support member 62 to face the second magnetic reading element 808.

According to such a configuration, an angle formed by the large-diameter annular portion 445 with respect to the second input-side support member 62 and an angle formed by the large-diameter annular portion 445 with respect to the small-diameter annular portion 444 can be detected.

The above-described embodiments have been described while assuming that the magnetic encoder is used. However, the type of the encoder is not limited to the magnetic type, and may be an optical type, for example.

FIG. 10(c) is a partial cross-sectional view illustrating a configuration in which a transmissive encoder is especially used among the optical encoders. An annular thin plate 812 has bending shape portions on the left and right sides in the vicinity of the circumference thereof, and a first light receiving element 815 and a second light receiving element 816 are arranged on the respective end portions on the left and right side of the bending shape portions. A first light emitting element 817 and a second light emitting element 818 are provided on both of front and rear surfaces of the annular thin plate 812, to face the first light receiving element 815 and the second light receiving element 816, respectively. In addition, a first code wheel (slit circular plate) 819 is provided on an outer periphery of the end portion of the output rotating body 44, and a second code wheel (slit circular plate) 820 is provided on an outer periphery of the end portion of the second input-side support member 62. That is, the light beams emitted from the first light emitting element 817 and the second light emitting element 818 are received by the first light receiving element 815 and the second light receiving element 816 via the first code wheel 819 and the second code wheel 820, respectively, whereby the angles are detected.

According to such a configuration, the angles can be detected with high accuracy without being affected by another magnetism, or the like.

FIG. 10(d) is a partial cross-sectional view illustrating a configuration in which a reflective encoder is especially used among the optical encoders. A first optical element 821 including a light emitting element and a light receiving element and a second optical element 822 including a light emitting element and a light receiving element are provided on the front and rear in the vicinity of the circumference of an annular thin plate 820, respectively. A first code wheel 823 on which an optical pattern including a reflective portion and a non-reflective portion is formed is provided at the end portion of the output rotating body 44, to face the first optical element 821, and a second code wheel 824 on which an optical pattern including a reflective portion and a non-reflective portion is formed is provided at the end portion of the second input-side support member 62, to face the second optical element 822. That is, the light beams emitted from the first optical element 821 and the second optical element 822 are reflected by the first code wheel 823 and the second code wheel 824, respectively, and received by the first optical element 821 and the second optical element 822, respectively, whereby the angles are detected.

According to such a configuration, the angles can be detected with high accuracy and compactly, without being affected by another magnetism, or the like.

Note that, needless to say, different angle detection mechanisms may be combined, such as a magnetic-type angle detection mechanism as an angle detection mechanism disposed on one surface of the annular thin plate 80, and an optical-type angle detection mechanism as an angle detection mechanism disposed on the other surface.

3.3 Others

The above-described embodiments have been described while assuming that the joint unit 100 is used for a joint portion of the robot arm 1. However, the joint unit 100 is not limited to such a configuration, and, for example, may be used in a portion other than the joint portion of the robot arm 1, or may be applied to other robots other than the robot arm 1.

The joint unit, the robot arm, and the robot according to the present invention are not limited to the configurations of the above-described embodiments, and the configurations may be appropriately changed without departing from the spirit of the present invention.

INDUSTRIAL APPLICABILITY

The joint unit according to the present invention can be used in the industry for manufacturing household or industrial robots, for example.

REFERENCE SIGNS LIST

1 robot arm
30 decelerator output shaft
31 stator
32 hollow rotor
34 hollow rotary shaft
37 wave generator
38 flex spline
39 circular spline
44 output rotating body
48 second code wheel
60 first input-side support member
62 second input-side support member
66 first code wheel 80 annular thin plate
81 magnetic reading element
100 joint unit
200 braking unit
300 housing

The invention claimed is:

1. A joint unit, comprising:
an input-side support member that supports a rotationally driven input shaft;
a decelerator that decelerates the input shaft to provide a deceleration output shaft;
an output rotating body that is coupled to the deceleration output shaft, and comprises a strain generating portion that generates strain due to rotation transmitted by the deceleration output shaft, an input-side portion that is a portion positioned between a portion coupled to the deceleration output shaft and the strain generating portion, and an output-side portion that is a portion positioned opposite from the input-side portion across the strain generating portion; and
an associated rotating body that is coupled to the output-side portion of the output rotating body to rotate together with the output rotating body, and is disposed in a space between the input-side support member and the input-side portion of the output rotating body,
wherein a first angle detection mechanism for detecting an angle formed between the associated rotating body and the input-side support member is provided for the associated rotating body and the input-side support member, and
a second angle detection mechanism for detecting an angle formed between the associated rotating body and the input-side portion of the output rotating body is provided for the associated rotating body and the input-side portion.

2. The joint unit according to claim 1, wherein
the associated rotating body has a flat plate shape,
the first angle detection mechanism is provided for one surface of the associated rotating body and the input-side support member, and
the second angle detection mechanism is provided for the other surface of the associated rotating body and the input-side portion of the strain generating portion of the output rotating body.

3. The joint unit according to claim 1, wherein
each of the first angle detection mechanism and the second angle detection mechanism is a mechanism for detecting an angle, comprising a code wheel on which a predetermined magnetic pattern is formed, and a magnetic reading element that faces the code wheel and reads the magnetic pattern.

4. The joint unit according to claim 3, wherein
in the first angle detection mechanism, the code wheel is fixed to the input-side support member, and the reading element is fixed to the associated rotating body to face the code wheel fixed to the input-side support member, and
in the second angle detection mechanism, the code wheel is fixed to the input-side portion, and the reading element is fixed to the associated rotating body to face the code wheel fixed to the input-side portion.

5. The joint unit according to claim 4, wherein
in the code wheel fixed to the input-side support member, the magnetic pattern is formed on an outer peripheral side surface of the input-side support member, and
in the code wheel fixed to the input-side portion, the magnetic pattern is formed on an outer peripheral side surface of the input-side portion.

6. The joint unit according to claim 4, wherein
in the code wheel fixed to the input-side support member, the magnetic pattern is formed on an end surface of the input-side support member perpendicular to a rotation direction of the input shaft, and
in the code wheel fixed to the input-side portion, the magnetic pattern is formed on a surface perpendicular to a rotation axis of the input-side portion.

7. The joint unit according to claim 1, wherein
each of the first angle detection mechanism and the second angle detection mechanism is a mechanism for detecting an angle, comprising a code wheel on which a predetermined optical pattern is formed, and an optical element that includes a light emitting element and a light receiving element, faces the code wheel and reads the optical pattern.

8. The joint unit according to claim 7, wherein
in the first angle detection mechanism, the code wheel is fixed to the input-side support member, and the optical element is fixed to the associated rotating body to face the code wheel fixed to the input-side support member, and
in the second angle detection mechanism, the code wheel is fixed to the input-side portion, and the optical element is fixed to the associated rotating body to face the code wheel fixed to the input-side portion.

9. The joint unit according to claim 1, wherein
each of the first angle detection mechanism and the second angle detection mechanism is an angle detection mechanism, comprising: a light emitting element; a code wheel on which a predetermined optical pattern is formed; and a light receiving element that receives a light emitted from the light emitting element and obtained via the code wheel, and reads the optical pattern,
in the first angle detection mechanism, the code wheel is fixed to the input-side support member,
in the second angle detection mechanism, the code wheel is fixed to the input-side portion,
the associated rotating body includes:
a flat plate portion disposed in a space between the input-side support member and the input-side portion of the strain generating portion of the output rotating body;
a first holding piece portion extending from the flat plate portion, and disposed on a back side of the code wheel to sandwich the code wheel attached to the input-side support member; and
a second holding piece portion extending from the flat plate portion, and disposed on the back side of the code wheel to sandwich the code wheel attached to the input-side portion,
in the first angle detection mechanism, the light emitting element is fixed to the flat plate portion, and the light receiving element is fixed to the first holding piece portion, whereby the light from the light emitting element passes through the code wheel fixed to the input-side support member, and is received by the light receiving element, and
in the second angle detection mechanism, the light emitting element is fixed to the flat plate portion, and the light receiving element is fixed to the second holding piece portion, whereby the light from the light emitting element passes through the code wheel fixed to the input-side portion, and is received by the light receiving element.

10. The joint unit according to claim 1, wherein an angle detection accuracy of the second angle detection mechanism is higher than an angle detection accuracy of the first angle detection mechanism.

11. The joint unit according to claim 1, wherein one of the first angle detection mechanism and the second angle detection mechanism is a magnetic-type angle detection mechanism, and the other is an optical-type angle detection mechanism.

12. The joint unit according to claim 1, wherein
the input shaft is coupled to an input-side member of the decelerator and is supported by the input-side support member,
the deceleration output shaft is coupled to an output-side member of the decelerator and is supported by the input shaft,
the output rotating body is coupled to the deceleration output shaft and faces the input-side support member, and
the associated rotating body is disposed between a surface facing the output rotating body of the input-side support member and a surface facing the input-side support member of the output rotating body.

13. The joint unit according to claim 12, wherein
the input shaft is hollow, and
the deceleration output shaft is inserted into the hollow input shaft and is supported with respect to an inner surface of the input shaft.

14. The joint unit according to claim 12, wherein the decelerator is a wave gear decelerator.

15. The joint unit according to claim 12, wherein an attaching portion of a predetermined braking device that brakes rotation of the deceleration output shaft is provided on the other end side opposite to a coupling end of the output rotating body with the deceleration output shaft.

16. The joint unit according to claim 12, wherein a third angle detection mechanism that detects a rotation angle of the input shaft with respect to the input-side support member is provided on the other end side opposite to a coupling end of the output rotating body with the input shaft.

17. The joint unit according to claim 1, wherein
the input-side portion is a small-diameter annular portion coupled with the deceleration output shaft in a center thereof; and the output-side portion is a large-diameter annular portion
having the same center as the small-diameter annular portion, and coupled with the small-diameter annular portion via the strain generating portion extending from the small-diameter annular portion in a radial direction,
the large-diameter annular portion and the small-diameter annular portion have large-diameter annular portion side holes and small-diameter annular portion side holes, respectively, so that the large-diameter annular portion side hole and the small-diameter annular portion side hole are linearly arranged in the radial direction,
a fixing tool is fixed to the small-diameter annular portion side hole and a head of the fixing tool is enclosed by the large-diameter annular portion side hole having an inner diameter slightly larger than an outer diameter of the fixing tool, whereby, when strain is generated in the strain generating portion due to rotation of the output rotating body, the head of the fixing tool is in contact with an inner wall of the large-diameter annular portion side hole to restrict the strain.

18. The joint unit according to claim 1, wherein
the decelerator is a wave gear decelerator including a wave generator, a flex spline, and a circular spline,
the input shaft is hollow, and one end portion of the input shaft is coupled to the wave generator and is supported by the input-side support member via a first bearing,
the deceleration output shaft is coupled to an output side of the flex spline and is supported by the input-side support member via a second bearing, and is inserted into the hollow input shaft and is supported by a third bearing with respect to the input shaft in a vicinity of an end portion opposite to the end portion of the input shaft, and
each of the first bearing, the second bearing, and the third bearing is a sealed bearing.

19. A robot arm, comprising the joint unit according to claim 1 in a predetermined joint portion.

20. A robot, comprising the joint unit according to claim 1 in a predetermined joint portion.

* * * * *